United States Patent
Havala

(10) Patent No.: US 7,366,181 B2
(45) Date of Patent: Apr. 29, 2008

(54) VIRTUAL PRIVATE NETWORK (VPN) WITH CHANNELIZED ETHERNET OVER SONET (EOS) INTERFACE AND METHOD

(75) Inventor: Paul F. Havala, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 996 days.

(21) Appl. No.: 10/656,702

(22) Filed: Sep. 6, 2003

(65) Prior Publication Data

US 2005/0053079 A1    Mar. 10, 2005

(51) Int. Cl.
  *H04L 12/28*   (2006.01)
  *H04L 12/56*   (2006.01)
(52) U.S. Cl. .................. 370/395.53; 370/392; 370/409
(58) Field of Classification Search .............. 370/392, 370/395.53, 409
  See application file for complete search history.

(56) References Cited

U.S. PATENT DOCUMENTS

| | | | | |
|---|---|---|---|---|
| 6,339,595 | B1 * | 1/2002 | Rekhter et al. | 370/392 |
| 6,633,571 | B1 * | 10/2003 | Sakamoto et al. | 370/401 |
| 6,757,298 | B1 * | 6/2004 | Burns et al. | 370/473 |
| 6,771,662 | B1 * | 8/2004 | Miki et al. | 370/469 |
| 6,788,681 | B1 * | 9/2004 | Hurren et al. | 370/389 |
| 7,079,544 | B2 * | 7/2006 | Wakayama et al. | 370/401 |
| 7,242,665 | B2 * | 7/2007 | Langille et al. | 370/217 |
| 2003/0110268 | A1 * | 6/2003 | Kermarec et al. | 709/227 |
| 2003/0174706 | A1 * | 9/2003 | Shankar et al. | 370/393 |
| 2004/0076166 | A1 * | 4/2004 | Patenaude | 370/401 |

OTHER PUBLICATIONS

Haeryong Lee et al., "End to End QoS Architecture for VPNs: MPLS VPN Development in a Backbone Network", Aug. 2000, Electronics and Telecommunications Research Institute, pp. 479-483.*

Jamieson et al., "MPLS VPN Architecture," XP-002311855, *Nortel (Northern Telecom) Ltd.*, Aug. 7, 1998, 16 pages.

Rosen et al., "BGP/MPLS VPNs," XP-002255256, *Cisco Systems, Inc.*, Mar. 1999, 25 pages.

"Delivering Ethernet Traffic in MAN/WAN Practical Ways to Offer Managed Ethernet Services," XP-002311856, *Vivace Networks*, 2001, 19 pages.

European Search Report in European Patent Application No. EP 04 02 0905, dated Jan. 4, 2005, 2 pages.

U.S. Appl. No. 09/805,868, entitled *"Network and Edge Router"*, inventor Hama, Daisuke, filed Mar. 14, 2001 (Japanese priority date Nov. 27, 2000), 51 pages of Specification, Claims and Abstract and 25 pages of drawings.

\* cited by examiner

*Primary Examiner*—Alpus H. Hsu
(74) *Attorney, Agent, or Firm*—Baker Botts L.L.P.

(57) ABSTRACT

A VPN includes a shared label switching network, a plurality of VLANs and edge routers interfacing the VLANs with the shared label switching network. The VLANs are each coupled to an edge router and communicate traffic using channelized EoS.

14 Claims, 16 Drawing Sheets

FIG. 3

VLAN PACKET 150: ...IP | TYPE | TAG (152) | SOURCE MAC | DESTINATION MAC

SWAP

MPLS PACKET 154: ...IP | VPN LABEL (156) | FORWARDING LABEL (158) | TYPE | SOURCE MAC | DESTINATION MAC

FIG. 4A (124)

| VLAN ID (VID) | VPN LABEL |
|---|---|
| N | M |
| N+1 | M+1 |
| ... | ... |
| N' | M' |

FIG. 4B

| OUTGOING I/F | EoS I/F (PORT) | EoS SUB I/F (CHANNELS) |
|---|---|---|
| EoS 0 | 1 | 1-6 |
| EoS 1 | 1 | 7 |
| EoS 2 | 2 | 1 |
| ... | ... | ... |
| EoS N | | |

FIG. 10A (a) L2 VPN LABEL TABLE OF PE A  124

| PE A #VPN IDENTIFIER | | | LABEL TABLE OF ENTERPRISE A | |
|---|---|---|---|---|
| VPN LABEL | L2 ADDRESS | OUTGOING I/F | VLAN ID (VID) | VPNi |
| 26 | | | 101 | COMPANY-A |

VLAN ID AND VPN IDENTIFIER ENTERED STATICALLY WHEN VPN/VLAN IS SET UP

L2 VPN ROUTING TABLE OF PE A (b) 
| PE A #VPN IDENTIFIER  ROUTING TABLE OF ENTERPRISE A |
|---|
|  |
|  |
|  |

125

FIG. 10B (a) L2 VPN LABEL TABLE OF PE A  124

| PE A #VPN IDENTIFIER | | | LABEL TABLE OF ENTERPRISE A | |
|---|---|---|---|---|
| VPN LABEL | L2 ADDRESS | OUTGOING I/F | VLAN ID (VID) | VPNi |
| 26 | MACA | EoS  0 | 101 | COMPANY-A |

L2 VPN ROUTING TABLE OF PE A (b)
| PE A #VPN IDENTIFIER   ROUTING TABLE OF ENTERPRISE A |
|---|
| LOOPBACK ADDRESS OF L2 MAC B VIA PE B; VLAN 152 |
| LOOPBACK ADDRESS OF L2 MAC C VIA PE C; VLAN 1501 |
| L2 MAC A IS DIRECTLY CONNECTED, ETHERNET0, VLAN 101 |

SET UP BY iBGP { (first two rows)

DIRECT CONNECT BECAUSE CPE IS DIRECTLY CONNECTED TO OWN PE (third row)

125

VPN TABLE OF ENTERPRISE A IN PE A

| L2 VPN LABEL TABLE OF ENTERPRISE A | | | | |
|---|---|---|---|---|
| VPN LABEL | OUTGOING I/F | MAC | VID | VPNi |
| 26 | EoS | MAC A | 101 | COMPANY A |
| L2 VPN ROUTING TABLE OF ENTERPRISE A | | | | |
| L2 | MAC B | LOOPBACK ADDRESS OF PE B; VLAN 152 | | |
| L2 | MAC C | LOOPBACK ADDRESS OF PE C; VLAN 1501 | | |
| L2 | MAC A | DIRECTLY CONNECTED, ETHERNET, VLAN 101 | | |

*FIG. 11A*

VPN TABLE OF ENTERPRISE A IN PE B

| L2 VPN LABEL TABLE OF ENTERPRISE A | | | | |
|---|---|---|---|---|
| VPN LABEL | OUTGOING I/F | MAC | VID | VPNi |
| 26 | EoS | MAC B | 152 | COMPANY A |
| L2 VPN TABLE OF ENTERPRISE A | | | | |
| L2 | MAC B | DIRECTLY CONNECTED, ETHERNET, VLAN 152 | | |
| L2 | MAC C | LOOPBACK ADDRESS OF PE C; VLAN 1501 | | |
| L2 | MAC A | LOOPBACK ADDRESS OF PE A; VLAN 101 | | |

*FIG. 11B*

VPN TABLE OF ENTERPRISE A IN PE C

| L2 VPN LABEL TABLE OF ENTERPRISE A | | | | |
|---|---|---|---|---|
| VPN LABEL | OUTGOING I/F | MAC | VID | VPNi |
| 26 | EoS | MAC C | 1501 | COMPANY A |
| L2 VPN LABEL TABLE OF ENTERPRISE A | | | | |
| L2 | MAC B | LOOPBACK ADDRESS OF PE B; VLAN 152 | | |
| L2 | MAC C | DIRECTLY CONNECTED, ETHERNET, VLAN 1501 | | |
| L2 | MAC A | LOOPBACK ADDRESS OF PE A; VLAN 101 | | |

*FIG. 11C*

| | |
|---|---|
| 1. | BROADCAST ARP PACKET DIRECTED TO CPE C (192.168.1.3) FROM CPE A |
| 2. | IN CASE OF BROADCAST DIRECTED TO CPE C (192.168.1.3) FROM CPE A, CREATE COPY OF BROADCAST PACKET AT PE A AS NECESSARY AND SEND PACKET TO PE B, PE C |
| 3. | SEND ARP-REPLY PACKET TO CPE A (192.168.1.1) FROM CPE C AUTOMATICALLY LEARN OR ENTER MAC ADDRESS OF EACH CPE IN L2 VPN LABEL TABLE, L2 VPN TABLE OF EACH PE |

VIRTUAL PRIVATE NETWORK (VPN) WITH CHANNELIZED ETHERNET OVER SONET (EOS) INTERFACE AND METHOD

TECHNICAL FIELD

This invention relates generally to communication networks, and more particularly to a Virtual Private Network (VPN) with channelized Ethernet over SONET (EoS) interface and method.

BACKGROUND

Virtual Private Networks (VPNs) are used to interconnect geographically remote offices, campuses, factories, research labs and other facilities of an enterprise across a shared network. The shared network may be a wide-area network (WAN) such as the Internet. The VPN may include an access server, a WAN router and a VPN-dedicated device at each geographic site. VPNs may utilize a Virtual Local Area Network (VLAN), a MultiProtocol Label Switching (MPLS) network or other network.

VLANs group network-connected devices without relation to their physical wiring and constructions. The sending and receiving of frames is performed within the same group and the broadcasting of frames also takes place within the same group. Communication with a different VLAN group generally uses the intermediary of a router.

MPLS provides a virtual communication path in an Internet Protocol (IP) WAN. In particular, MPLS adds a label onto an IP packet that identifies a connection. The network router transmits the IP packet by popping, pushing or swapping the value of the label. In this way, an IP connection-type service is provided.

SUMMARY OF THE INVENTION

A Virtual Private Network (VPN) with a channelized Ethernet over SONET (EoS) interface and method are provided. In particular, a channelized EoS interface may be incorporated directly on an edge router implementing Virtual Local Access Network (VLAN) mapped Multi Protocol Label Switching (MPLS).

In accordance with one embodiment, a VPN includes a shared label switching network, a plurality of VLANs and edge routers interfacing the VLANs with the shared label switching network. The VLANs are each coupled to an edge router and communicate traffic using channelized EoS.

More specifically, in accordance with a particular embodiment, the shared network may comprise an MPLS network. In this and other embodiments, each edge router may have a table for storing correspondence between VLAN identifiers (VIDs) contained in VLAN packets and VPN identifiers (VPN labels) contained in MPLS packets. A transmit-side edge router may find a VPN label that corresponds to the VID of a VLAN packet, generate an MPLS packet having the VPN label and send the MPLS packet to the MPLS network. The receive-side edge router may find a VID that corresponds to a VPN label contained in an MPLS packet received from the MPLS network, generate a VLAN packet having the VID and send the VLAN packet to the VLAN indicated by the VID.

In a specific embodiment, the transmit-side edge router may have a route decision unit for deciding a route along which an MPLS packet is sent in the direction of the receive-side edge router, and a label table for storing a forwarding label, which specifies the path decided by the route decision unit, mapped to an address of the receive-side edge router. In this embodiment, the transmit-side edge router finds a receive edge router corresponding to a destination Media Access Control (MAC) address of a packet, finds a forwarding label that corresponds to the receive-side edge router from the label table, generates an MPLS packet that contains the VPN label and the forwarding label and sends the MPLS packet to the MPLS network.

Technical advantages of one or more embodiments may include providing an inexpensive, highly scalable VPN with virtual concatenation of local access channels. The VPN may include access networks using VLAN-compatible switches and a shared core network using MPLS-compatible routers.

Another technical advantage of one or more embodiments may include providing access to Layer 2 (L2) VLANs, also called Virtual Private LAN Service (VPLS), over channelized EoS interfaces. The channelized EoS may lower the cost of the VPLS as each channel may be a virtualized concatenation of SONET channels. Each SONET channel may act as a logical interface and within the logical interface VPLS services may be defined based on the interface or based on VLAN identifiers.

Still another advantage of one or more embodiments may include providing enhanced central office fiber management, eliminating or mitigating the need for Ethernet switching at add drop multiplexers (ADMs) and matching the operations infrastructure of many large carriers. Moreover, security may be assured on a per-connection basis and an Internet Protocol (IP) private-line service, which serves as a substitute for a private line, can be provided efficiently by an IP network. In addition, a very high degree of scalability is provided.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

FIG. 3 illustrates one embodiment of conversion of a VLAN packet to a MPLS packet in the network of FIG. 1;

FIGS. 4A-B illustrate one embodiment of the conversion table of the subrouter and the EoS table of the EoS line card of FIG. 2;

FIGS. 10A-B illustrate one embodiment of the VPN tables of FIG. 9;

FIGS. 11A-C illustrate one embodiment of enterprise VPN tables for Enterprise A in the network of FIG. 6;

DETAILED DESCRIPTION OF THE DRAWINGS

Figure 1:
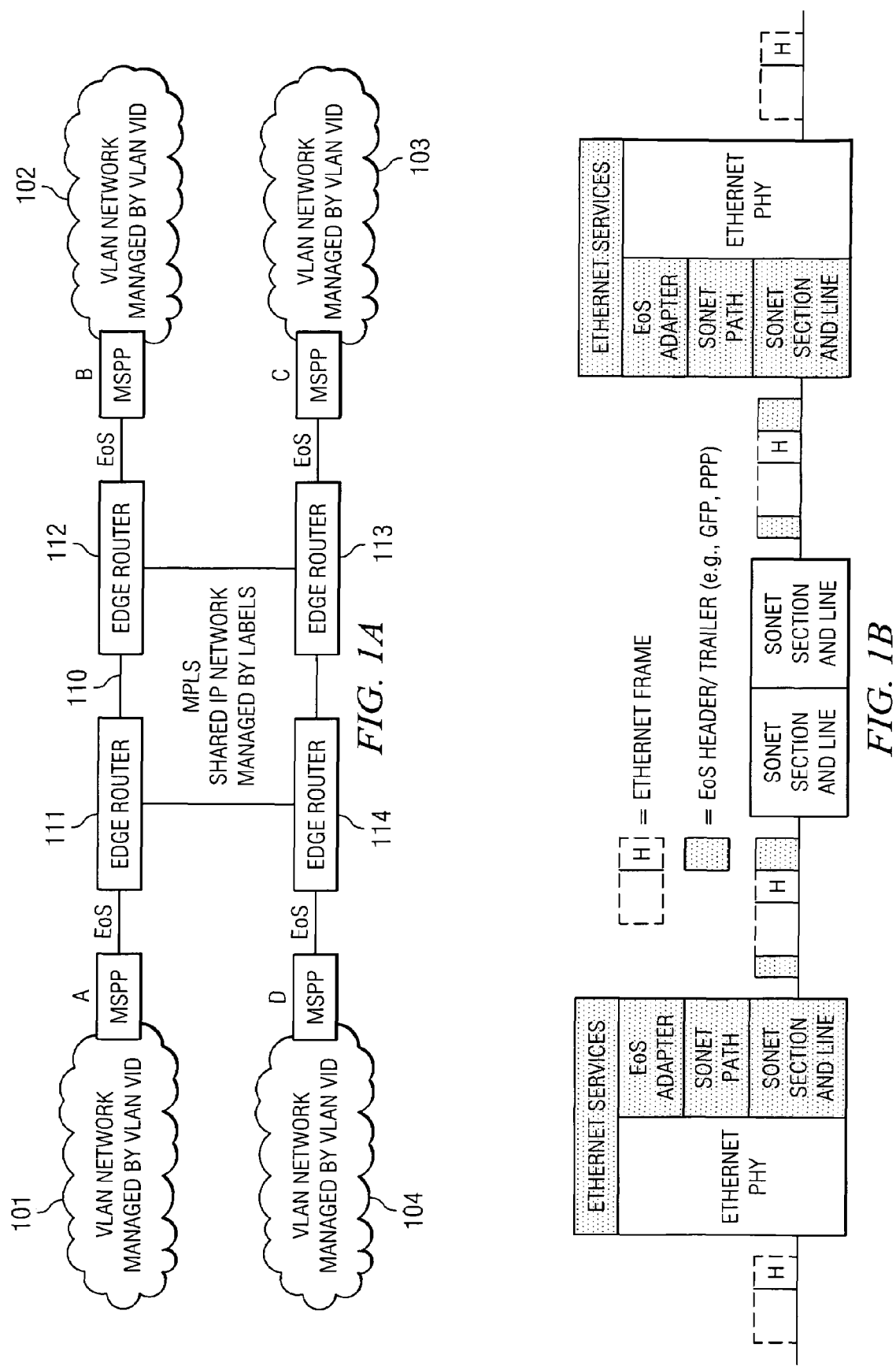
FIGS. 1A-B illustrate one embodiment of virtual local area networks (VLANs) with channelized Ethernet over SONET (EoS) access to a shared label switching network.

FIGS. 1A-B illustrate one embodiment of virtual local access networks (VLANs) with channelized Ethernet over SONET (EoS) access to a shared label switching network to form a plurality of Virtual Private Networks (VPNs). In this embodiment, the VPNs are Layer 2 (L2) VPNs. Layer 3 or other layer VPN could be used. In this embodiment, the shared label switching network is a MultiProtocol Label Switching (MPLS) network. MPLS provides a path (a virtual communication path) into an IP network. It will be understood that the shared network may comprise other label switching networks, Internet Protocol (IP) networks or other suitable networks with tunneling or other functionality to support geographically distributed virtual private networks (VPNs). For example, non IP such as IPX, FNA, AppleTalk and the like may be implemented.

Referring to FIG. 1A, a mixed network comprises VLANs 101-104 of sites A to D, respectively, and a shared MPLS network 110. Schemes for implementing a VLAN include (1) port-based VLAN, (2) MAC-address database VLAN and (3) policy-based VLAN. The MPLS network may comprise Label Switching Routers (LSRs). As described in more detail below, the VLANs 101-104 are managed by prescribed VLAN IDs (VIDs). The shared MPLS network 110 is managed by labels and may be constructed on the Internet or other Wide Area Network (WAN) by MPLS. The edges of the MPLS network 110 are provided with edge routers 111-114. Edge routers 111-114 may be any suitable device within or connected to the shared core network and operable to interface between a VLAN (or other suitable LAN) and the shared core network and to switch, route, direct, bridge, convert or otherwise process and/or send traffic. As used herein, send means to forward, allow or initiate forwarding or sending, transmitting or otherwise directing.

A transmit-side edge router 111-114 converts ingress VLAN packets, which enter from the VLANs 101-104, to MPLS packets and transmits the MPLS packets over the MPLS network 110. A receive-side edge router 111-114 converts MPLS packets to egress VLAN packets and outputs the VLAN packets to prescribed VLANs.

In a particular embodiment, as described in more detail below, the transmit-side edge router 111-114 converts a VID contained in a VLAN packet to a VPN label, which is a VPN identifier, finds a forwarding label for forwarding the packet along a prescribed route on the basis of the destination of the VLAN packet, imposes these labels in place of the VID to generate an MPLS packet, and sends the MPLS packet to the MPLS network 110. As used herein, find means to look-up, determine, retrieve or otherwise become aware of. The MPLS network 110 routes the MPLS packet to the target receive-side edge router 111-114 over a preset route while the forwarding label of the packet is replaced. Upon receiving the MPLS packet from the MPLS network 110, a receive-side edge router 111-114 removes the forwarding label, converts the VPN label to the original VID, adds the VID to the packet in place of the label to generate a VLAN packet and sends the VLAN packet to the VLAN 101-104 indicated by the VID. In this way, a packet can be transmitted from a transmit-side VLAN 101-104 belonging to a certain VPN to a receive-side VLAN 101-104 belong to the same VPN.

The VLANs 101-104 are each connected to the MPLS network 110 by channelized Ethernet over SONET (EoS) interfaces. As used herein, each means every one of at least a subset of the identified items and SONET means synchronous optical networks including Synchronous Signal Digital Hierarchy (SDH) networks. To support EoS, the network elements of each VLAN 101-104 may include MultiService Provisioning Platforms (MSPPs) which provide access to Ethernet services over EoS.

For channelized EoS, a SONET path or a virtual concatenation of SONET paths provides a point-to-point tunnel. Traditional SONET paths include STS-1 (51.84 Mbps), STS-Nc (e.g., 622.08 Mbps for STS-12c) and VT1.5 (1.728 Mbps) paths. Virtual concatenation combines a number of like paths (e.g., 5 STS-3 paths, virtually concatenated into STS-3c-5v) to present a single payload to the EoS adaption layer. Virtual concatenation provides additional bandwidth granularity for tunnels (i.e., at integer multiples of traditional SONET rates) in a manner that is transparent to the SONET network as virtual concatenation is visible only to SONET path terminating elements and the SONET network operates at the SONET section and line layers.

In the mixed network, edge network elements of the VLANs 101-104 and of the MPLS network 110 include SONET interfaces that support physical layer channelization in which Synchronous Transport Signal (STS) or Virtual Tributary (VT) paths are multiplexed onto a single physical interface. An EoS protocol stack in accordance with one embodiment is illustrated by FIG. 1B.

Figure 2:
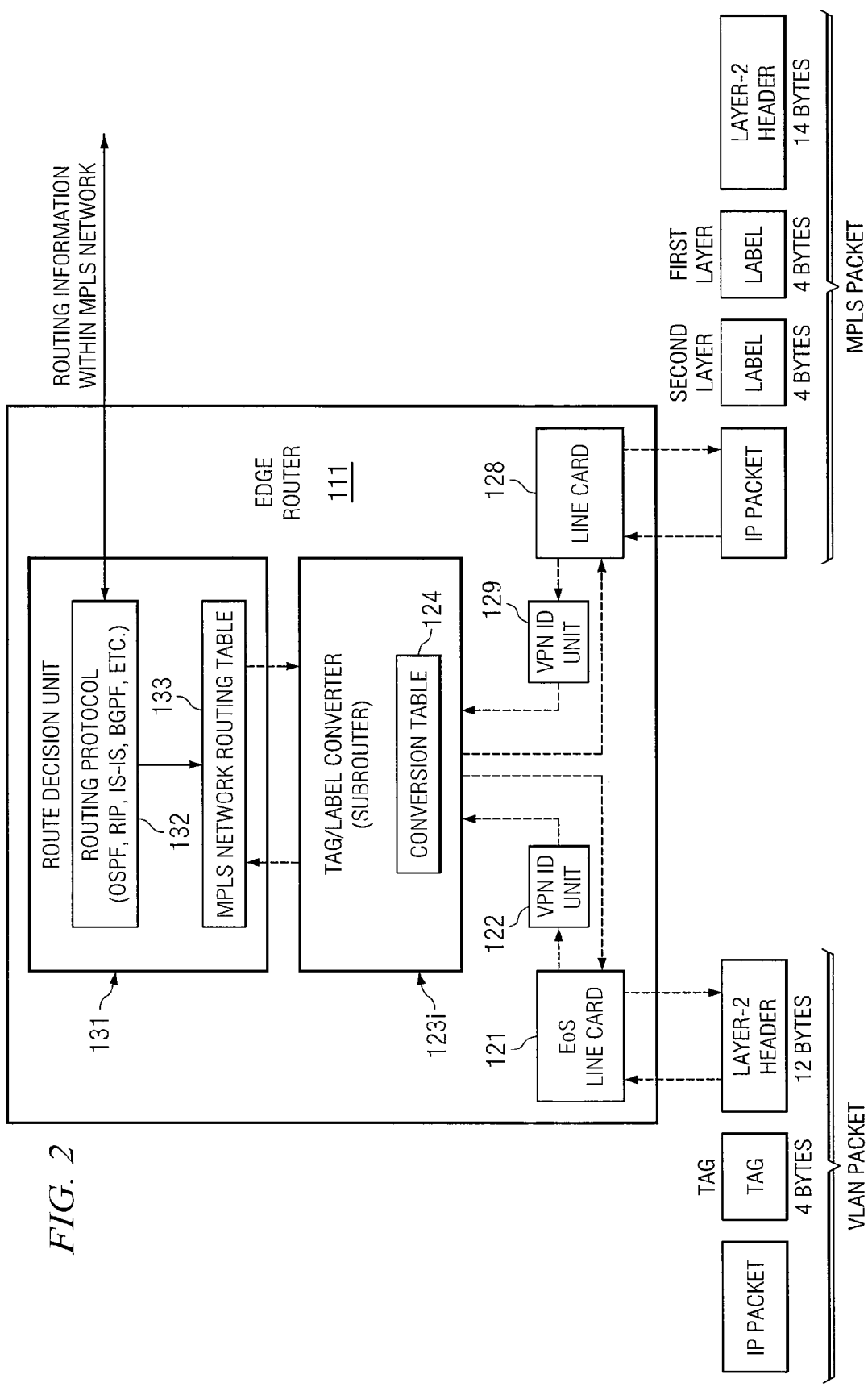
FIG. 2 illustrates one embodiment of the edge router of FIG. 1.

FIG. 2 illustrates one embodiment of the edge router 111 of FIG. 1. The other edge routers may be identically or similarly constructed. The edge router 111 may be otherwise suitably constructed with disparate elements and/or with its functionality otherwise distributed or combined. The functionality of edge router 111 and other components of the network may be performed by logic encoded in media. The logic may be hardware or software based.

Referring to FIG. 2, the edge router 111 has one or more line cards 121 equipped with an EoS interface function for receiving a VLAN packet from a certain VLAN. Each EoS line card 121 may be associated with a separate VPN identification unit 122. Alternatively, a single VPN identification unit 122 may be associated with a plurality or all of the EoS line cards 121 of the edge router 111. The VPN identification unit 122 identifies, in one embodiment, a VPN by referring to the VID of the received VLAN packet and inputs the packet to a tag/label converter (subrouter) 123*i* (i=1, 2, . . . ) that corresponds to the VPN. The subrouter 123*i* corresponding to the identified VPN has a conversion table 124 which, in one embodiment, stores the correspondence between (1) VLAN IDs (VIDs) and (2) VPN identifiers (VPN labels) that specify VPNs to which the VLANs specified by the VIDs belong. Details of the conversion table 124 are illustrated in FIG. 4A. FIG. 4B illustrates one embodiment of an EoS table in the EoS line card 121 for mapping to physical ports and channels (i.e. STS or VT time slots or the normal or virtual concatenation thereof) of the channelized EoS interface.

The edge router 111 may further include a route decision unit 131 for deciding beforehand a route to a receive-side edge router 111-114 using a routing protocol 132 and storing a forwarding label (a push label), which specifies the decided route, in an MPLS network routing table (forwarding-label memory) 133 in correspondence with the IP address of the receive-side edge router 111-114.

FIG. 3 illustrates one embodiment of conversion of a VLAN packet to an MPLS packet. As used herein, conversion means to swap, translate, transition or otherwise modify addressing information in a packet. In this embodiment, the tag of a VLAN packet is swapped for a VPN label and a forwarding label to generate the MPLS packet. The VLAN packet may be otherwise suitably converted to an MPLS or other label switching packet.

Referring to FIG. 3, when a VLAN packet 150 enters, the subrouter 123i refers to conversion table 124 to find the VPN identifier (VPN label) 156 corresponding to the VID contained in the tag 152. The subrouter 123i further finds the receive-side edge router 111-114 based upon the destination address contained in the VLAN packet 150 and finds the forwarding label 158, which has been stored in correspondence with the IP address of the edge router 111-114, from the MPLS network routing table 133.

If the label is found, the subrouter 123i inserts, swaps, or replaces the VPN label 156 and the forwarding label 158 in place of the tag 152 of the VLAN packet 150 to generate the MPLS packet 154 and sends the MPLS packet 154 to the MPLS network 110 via a line card 128. The MPLS network 110 routes the MPLS packet 154 to the target receive-side edge router 111-114 over the preset route while replacing the forwarding label 158. The line card 128 of the receive-side edge router 111-114 receives an MPLS packet 154 from the MPLS network 110, and a VPN identification unit 129 identifies the VPN by referring to the VPN label 156 of the MPLS packet 154 and inputs the packet to the subrouter 123i (i=1, 2, . . . ) that corresponds to the VPN.

The subrouter 123i removes the forwarding label 158 and then refers to the conversion table 124 to find the VID that corresponds to the VPN label 156. The subrouter 123i then generates a VLAN packet 150 by adding a tag 152, which includes the VID found, in place of the VPN label 156 and sends the VLAN packet 150 to the VLAN 101-104, which is indicated by the VID, via the EoS line card 121 on the side of the VLAN. The EoS line card 121 would access the EoS table of FIG. 4B and map the outgoing interface to the correct port (interface) and channel(s) (sub-interface). It should be noted that the content of table 124 is not the same in each of the edge routers 111-114 and that the VID values of VLANs that belong to the same VPN are not necessarily the same. Further, though not shown clearly in FIG. 2, a subrouter may exist for every VPN, as illustrated in FIG. 5.

Thus, for example, when communication is initiated from the VLAN 101 of site A to the VLAN 103 of site D in FIG. 1, the tag 152 and label 156 are swapped by the edge routers 111, 113 in the manner shown in FIG. 3. As a result, a VLAN packet 150 that enters from the transmit-side VLAN 101 is changed to an MPLS packet 154 by the edge router 111, the MPLS packet 154 is transmitted through the MPLS network 110 and is converted to a VLAN packet 150 by the edge router 113, and this VLAN packet is then transmitted to a VLAN 103 belonging to a VPN identical with that on the transmit side.

Figure 5:
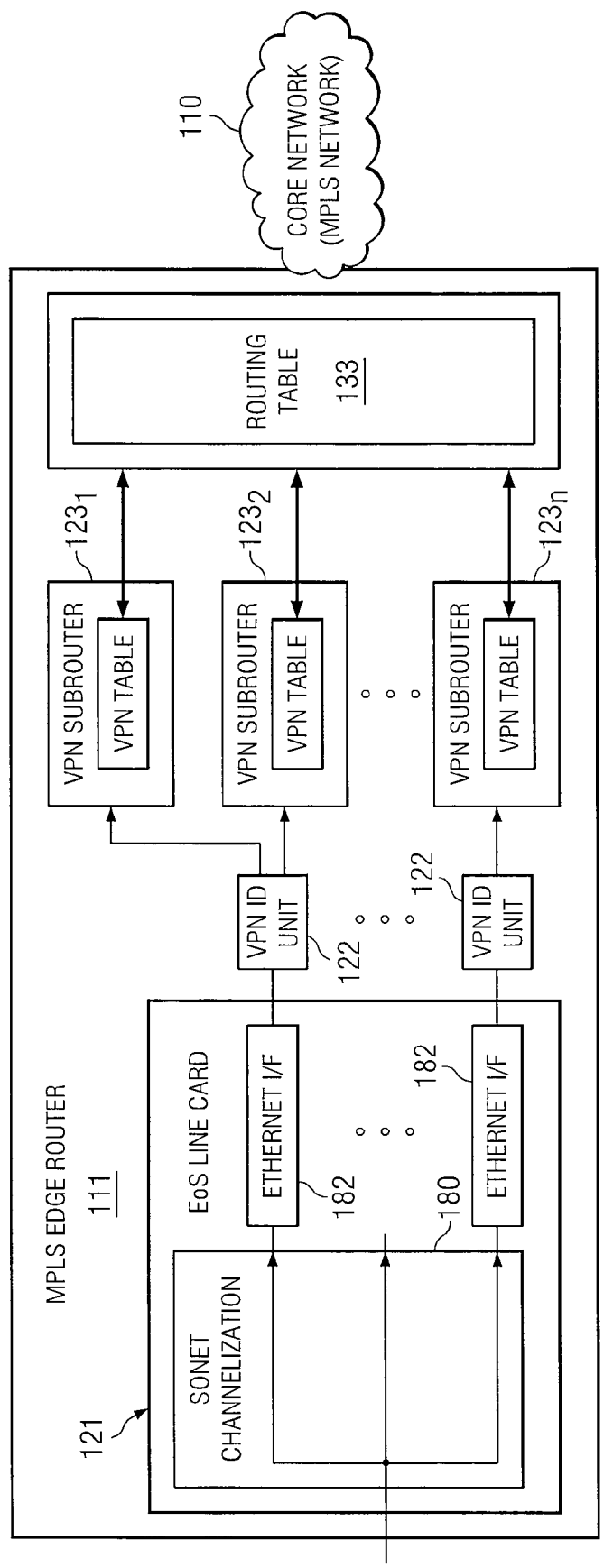
FIG. 5 illustrates one embodiment of the Ethernet over SONET (EoS) line card of FIG. 2.

FIG. 5 illustrates one embodiment of the EoS line card 121 of FIG. 2. In this embodiment, an Ethernet interface is provided for each Ethernet channel. The EoS line card 121 may be otherwise suitably configured and its functionality otherwise distributed or combined.

Referring to FIG. 5, the EoS line card 121 includes SONET channelization unit 180 and Ethernet interfaces 182. In this embodiment, each Ethernet interface is coupled to a corresponding VPN identification unit 122. For example, if the outgoing interface of the VPN table includes interface and sub-interface information, a single Ethernet interface and VPN identification table 122 may be used at the EoS line card 121.

In operation, a concatenated SONET channel is received by the SONET channelization unit 180 of the EoS line card 121. The SONET channelization unit 180 separates out or demultiplexes the distinct Ethernet channels and forwards each channel to a corresponding Ethernet interface 182. The EoS table of FIG. 4B provides the EoS identifier based on the unique port and channel, which may be used to indicate the Ethernet interface. Each Ethernet interface 182 processes and forwards received Ethernet traffic to the corresponding VPN unit 122. As previously described, the VPN identification unit 122 identifies a VPN by referring to the VID of the received VLAN packet and inputs the packet in the corresponding subrouter 123i for conversion.

For egress traffic from the edge router 111, the EoS line card determines an egress interface (port) and sub-interface (channels) based on the outgoing interface EoS identifier provided by the subrouter 123i. This mapping in the EoS line card 121 is performed using the EoS table of FIG. 4B. Egress VLAN traffic may be otherwise suitably mapped to an interface and sub-interface of the channelized EoS.

Figure 6:
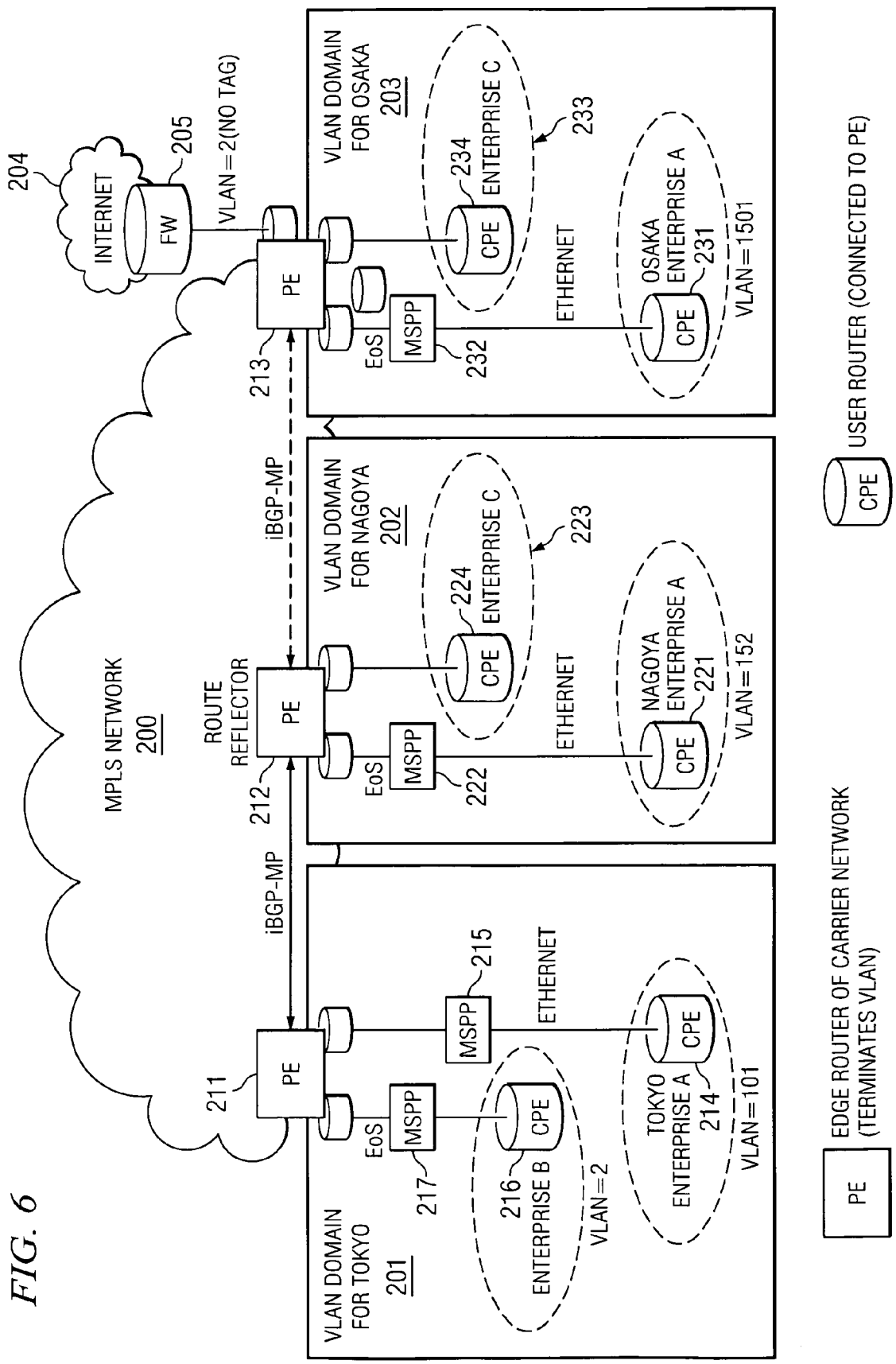
FIG. 6 illustrates one embodiment of the topology of enterprise networks utilizing a shared MPLS network.

FIG. 6 illustrates one embodiment of the topology of Enterprise networks using a shared MPLS network. In this embodiment, the edge routers are illustrated as provider edge routers (PEs) and MSPP platforms are disposed between the VLANs and the PEs to provide channelized EoS.

Referring to FIG. 6, an MPLS network 200 is formed on the Internet serving as a shared network. Numerals 201, 202 and 203 denote VLAN domains for Tokyo, Nagoya and Osaka, respectively. The VLAN domains may be for other cities, geographic regions, countries or states. For example, in one embodiment, the VLAN domains may comprise San Francisco, Dallas and New York. The Internet is indicated at 204 and a firewall (FW) is shown at 205. A plurality of enterprise VLANs have been set up at each of the VLAN domains. Provided between the MPLS network 200 and the VLAN domains 201-203 at the edge of the MPLS network are PE routers 211-213, respectively, which terminate the respective VLANs. PE routers in this embodiment support MPLS and are VPN aware.

A VLAN (VID=101) of an Enterprise A and a VLAN (VID=2) of an Enterprise B in the Tokyo area have been formed in the VLAN domain 201 for Tokyo. A CPE router (Customer Premises equipment Edge router) 214 constituting part of the VLAN (VID=101) of Enterprise A is connected to a first port of the PE router 211 via a MSPP element 215. As previously described, the MSPP element provides mapping or adaptation of Ethernet interfaces to SONET channels. Accordingly, the CPEs in each VLAN domain 101-103 communicate with the MSPP element by Ethernet and the MSPP element communicates with the corresponding PE router 211-213 via channelized EoS. A CPE router 216 constituting part of the VLAN (VID=2) of Enterprise B is connected to a second port of PE router 211 by MSPP element 217.

A VLAN (VID=152) of the Enterprise A and an intranet of an Enterprise C in the Nagoya area have been formed in the VLAN domain 202 for Nagoya. A CPE router 221 constituting part of the VLAN (VID=152) of Enterprise A is connected to a first port of the PE router 212 via a MSPP element 222. A CPE router 224 constituting part of the intranet of Enterprise C is connected to the second port of PE router 212.

A VLAN (VID=1501) of the Enterprise A and an intranet of the Enterprise C in the Osaka area have been formed in the VLAN domain 203 for Osaka. A CPE router 231 constituting part of the VLAN (VID=1501) of Enterprise A is connected by Ethernet to a first port of the edge PE router 213 via a MSPP element 232. A CPE router 234 constituting part of the intranet of Enterprise C is connected to the second port of PE router 213.

Figure 7A:
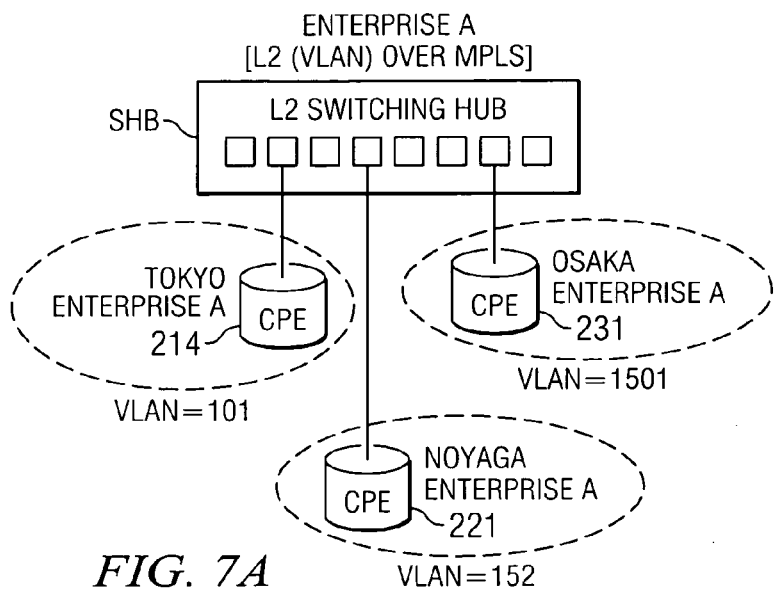
FIGS. 7A-C illustrate one embodiment of a logical view of the enterprise networks of FIG. 6.
Figure 7B:
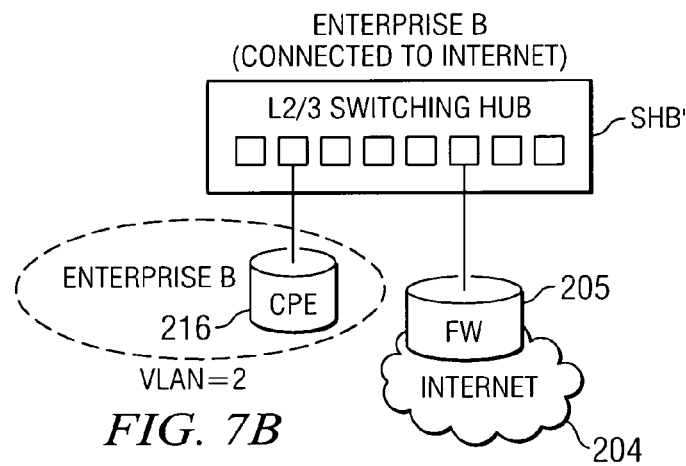
Figure 7C:
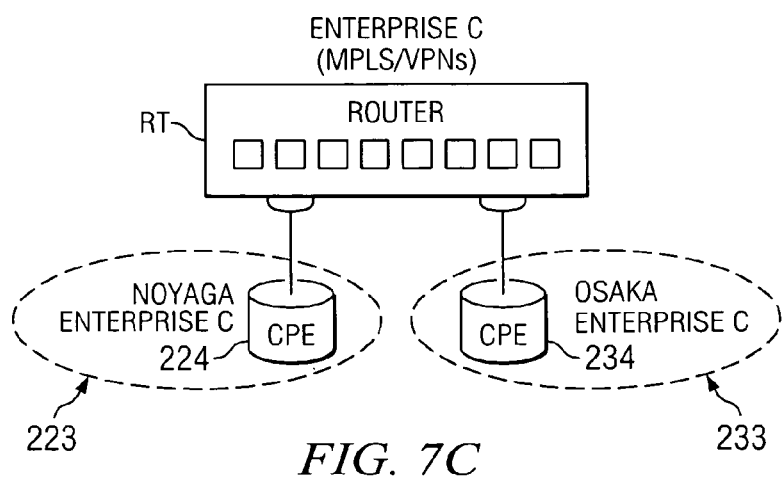

The VLAN (VID=101), VLAN (VID=152) and VLAN (VID=1501) of Enterprise A in the respective areas construct the same VPN. If the MPLS network 200 is viewed from the side of Enterprise A, therefore, it appears as though the CPE routers 214, 221, 231 have been connected to a Layer-2 switching hub SHB, as illustrated in FIG. 7A, and the network of Enterprise A takes on an L2 VLAN-over-MPLS network topology in which a core network is constructed by the MPLS network and an access network is constructed by the VLANs. If the side of the MPLS network 200 is viewed from the side of Enterprise B, it appears as though the CPE router 216 and firewall 205 have been connected to a Layer-2/3 switching hub SHB', as illustrated in FIG. 7B, and the network of Enterprise B takes on the form of an Internet connection. If the side of the MPLS network 200 is viewed from the side of Enterprise C, it appears as though the CPE routers 224, 234 of the intranets 223, 233, respectively, have been connected to a router RT, as illustrated in FIG. 7C, and the network of Enterprise C takes on the form of an MPLS/VPNs network topology in which the VPN is constructed by the MPLS network.

Figure 8:
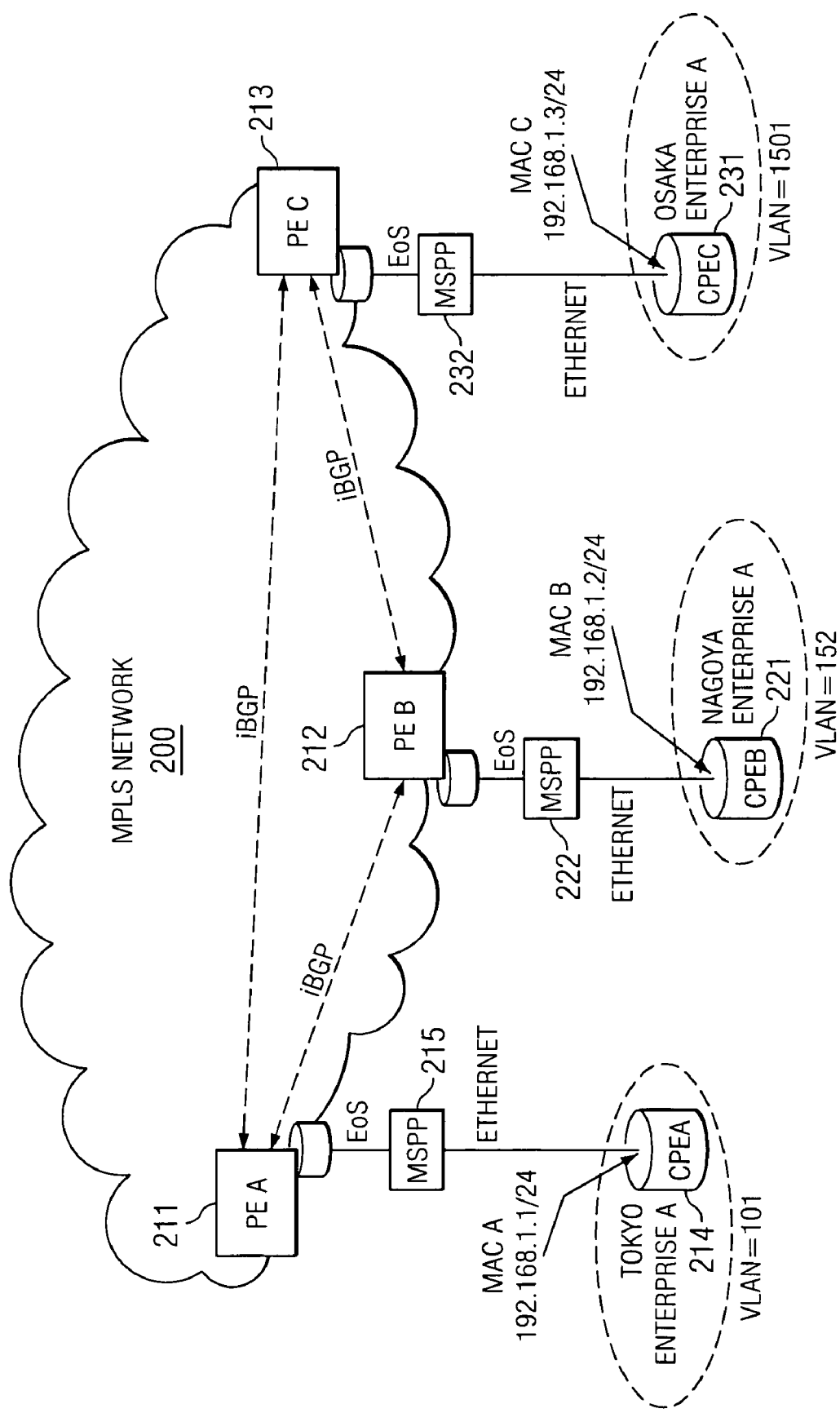
FIG. 8 illustrates one embodiment of the Layer-2 (L2) VPN for the Enterprise A of FIG. 6.

FIG. 8 illustrates one embodiment of the L2 VPN for the Enterprise A of FIG. 6. The components of Enterprise A that are identical to those of FIG. 6 are designated by like reference characters. Media Access Control (MAC) addresses MAC A, MAC B and MAC C, which are L2 addresses, have been assigned to the routers CPE A 214, 221 and 231, respectively, that construct the VLANs.

Figure 9:
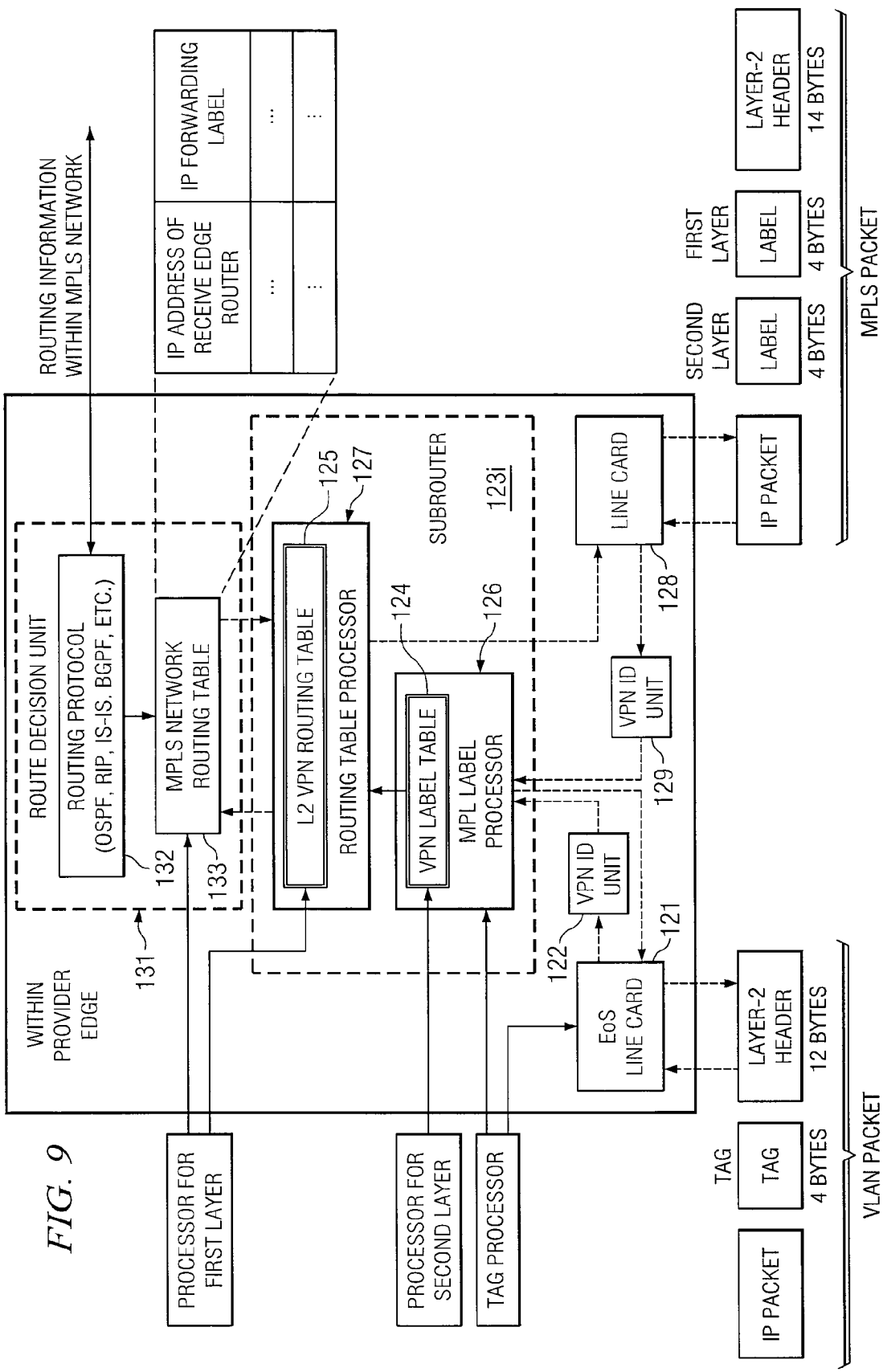
FIG. 9 illustrates one embodiment of the provider edge (PE) routers of FIG. 6.

FIG. 9 illustrates one embodiment of the PE routers of FIG. 6. The PE routers 211-213 may be identical or similar to edge router 111 of FIG. 2. Components in FIG. 9 that are identical to those of FIG. 2 are designated by like reference characters.

The line card 121, which has a channelized EOS interface function, receives a VLAN packet from a prescribed VLAN. As previously described, the VLAN packet is received by the SONET channelization unit 180 of the EoS line card 121 for demultiplexing of the Ethernet channels and forwarding to a corresponding Ethernet Interface from which the VLAN packet is forwarded to the corresponding VPN identification unit 122. The VPN identification unit 122 identifies the VPN by referring to the VID of the received VLAN packet and inputs the packet to the subrouter 123$i$ that corresponds to this VPN. As shown in (a) of FIGS. 10A and 10B, the L2 label table 124 of the subrouter 123$i$ stores, in one embodiment, the correspondence among (1) VPN labels (VPN identifiers), (2) L2 addresses (MAC addresses) of CPE routers under control, (3) output-side interfaces, (4) identifiers (VIDS) of VLANs connected to the edge routers, and (5) VPNI (VPN instance: a convenient name for a VPN identifier). The output-side interfaces provide the logical EoS identifier that is mapped at the EoS line card 121 via the EoS table of FIG. 4B to interface (port) and sub-interface (channels) for channelized EoS. In another embodiment, the outgoing interface field may provide the interface and sub-interface information for ports and channels for channelized EoS. In this embodiment, the EoS table may be omitted.

FIG. 10A illustrates the initial state and FIG. 10B the state that results after various data have been set. For every VLAN constructing the VPN, a L2 VPN routing table 125, in one embodiment, stores (1) a L2 address (MAC address) of the CPE router within the VLAN, (2) a loopback address (IP address) of the edge router to which the CPE router is connected, and (3) an identifier (VID) of the VLAN to which the CPE router belongs, as shown in (b) of FIGS. 10A and 10B. In the example of FIG. 8, (1) MAC addresses MAC A, MAC B, MAC C of CPE routers 214, 221, 231, respectively, (2) loopback addresses (IP addresses) of edge routers (PE A, PE B, PE C) 211, 212,213 to which the CPE routers are connected, and (3) VIDs (=101, 152, 1501) to which the CPE routers belong are stored in the table 125 in correspondence with the VLAN (VID=101), VLAN (VID=152) and VLAN (VID=1501), respectively, as shown in (b) of FIG. 10B.

The MPLS network routing table (forwarding-label memory) 133 stores forwarding labels which specify the route to the receive PE router 211-213. Using a routing protocol, the route decision unit for deciding the route within the MPLS network 200 searches for routes from the transmit-side PE router 211-213 to the receive-side PE router 211-213 and assigns a label to each route in accordance with the LDP (Label Distribution Protocol) in such a manner that the VLANs belonging to the same VPN can communicate with one another. Accordingly, the route decision unit 131 decides the route to the receive-side PE router 211-213 using the routing protocol 132 and stores the forwarding label 158 (push label), which specifies the route decided, in the forwarding label table 133 in a form mapped to the loopback address (IP address) of the receive-side PE router 211-213.

If a VLAN packet enters as an input, a VPN label processor 126 finds the VPN identifier (VPN label) 156, which corresponds to the VID contained in the tag, from the VPN label table 124. Further, on the basis of the destination MAC address contained in the VLAN packet 150, a routing table processor 127 obtains the loopback address of the output-side edge router 211-213 from the L2 VPN routing table 125 and then finds the forwarding label (push label) 158, which corresponds to the above-mentioned loopback address (IP address), from the forwarding label table 133. If the VPN label 156 and push label 158 have been found, the subrouter 123$i$ swaps the VPN label 156 and forwarding label 158 for the tag 152 to generate an MPLS packet 154, as shown in FIG. 3, and sends the MPLS packet 154 to the MPLS network 200 via the line card 128.

The MPLS packet 154 arrives at the target receive-side PE router 211-213 along the preset route through the MPLS network 200 while its forwarding label 158 is replaced. The line card 128 of the receive-side PE router 211-213 receives the MPLS packet 154 from the MPLS network 200, and the VPN identification unit 129 identifies the VPN by referring to the VPN label 156 of the MPLS packet 154 and inputs the packet 154 to the subrouter 123$i$ (i=1, 2, ... ) corresponding to the VPN. The subrouter 123$i$ removes the forwarding label 158 and refers to the VPN label table 124 to find the VID corresponding to the VPN label 156. The subrouter 123i then swaps a tag 152, which contains the VID, for the VPN label 156 to thereby generate a VLAN packet 150 and sends this VLAN packet 150 via the line card 121 to the VLAN indicated by the VID. It should be noted that the VPN label tables 124 in the PE routers 221-213 (FIG. 8) are not identical in content and that the VID values of VLANs that belong to the same VPN are not necessarily the same. Further, though not shown clearly in FIG. 9, the subrouter 123i (i=1, 2, . . . ) and the forwarding label table 133 may exist for every VPN.

In order to arrange it so that VLANs belonging to a VPN can communicate with each other, a route is establish beforehand between the PE routers 211-213 to which these VLANs are connected and the forwarding label stored in the forwarding label table 133 (FIG. 9) of the router along the route, and the VPN label table 124 and the L2 VPN routing table 125 are created.

In one embodiment, to create the VPN label table 124 and L2 VPN routing table 125, the operator may manually enter the VPN identifier (VPN label), the VLAN identifier (VID) and the VPNi, as illustrated at (a) in FIG. 10A. If these items of data are input to the PE router 211-213, the VPN label processor 126 of the edge router uses the ARP (Address Resolution Protocol) to find the MAC address of the CPE router of the VLAN connected to this processor, finds the interface of the route over which the MPLS packet with the appended push label is sent, sets this as shown in (a) of FIG. 10B and creates the VPN label table 124.

Next, the routing table processor 127 finds the MAC address of the locally connected CPE router and the VLAN identifier (VID) from the VPN label table 124 and creates direct-connect information of the L2 VPN routing table 125, which is illustrated, for example, in (b) of FIGURE 10B. The PE routers (PE A, PE B, PE C) 211, 212, 213 connected to the VLANs (VIDs=101, 152, 1501) that construct the VPN thereafter each send the other PE routers 211-213 the MAC address of the locally connected user router CPE, the loopback address (IP address) of the locally connected PE router 211-213 and the VID by using the iBGP (interior Border Gateway Protocol). As a result, each PE router 211-213 completes the fabrication of the L2 VPN routing table 125, as illustrated in (b) of FIG. 10B, based upon the received information. Thus, L2 VPN routing tables 125 shown in FIGS. 11A-C are created in the PE routers 211, 212, 213, respectively, with regard to the VPN of Enterprise A in FIG. 8.

Figure 12:
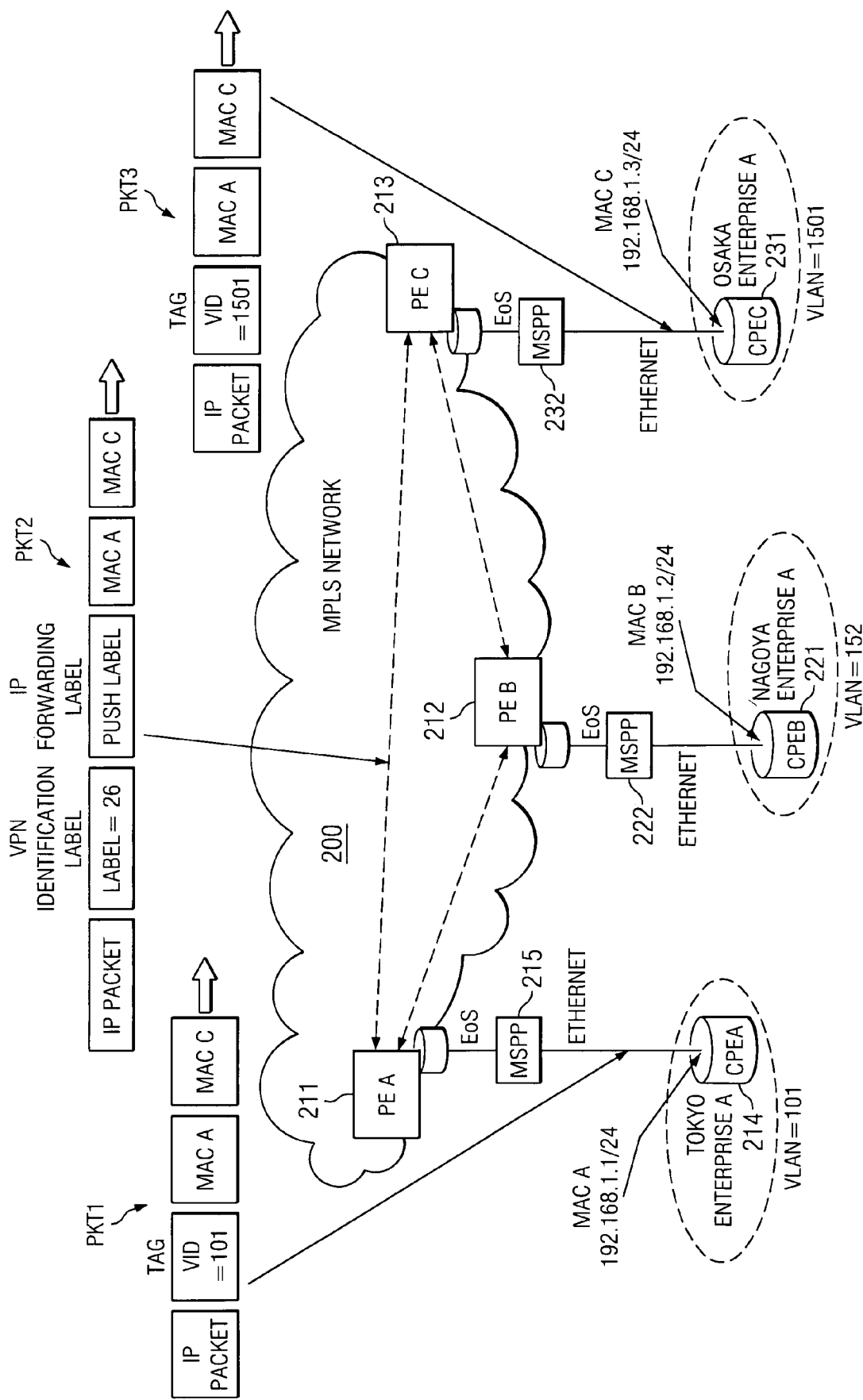
FIG. 12 illustrates exemplary transmission of a packet between customer premise equipment (CPEs) of disparate domains for Enterprise A of FIG. 6.

FIG. 12 illustrates exemplary transmission of a packet between CPEs of disparate domains for Enterprise A of FIG. 6. In particular, FIG. 12 illustrates an example of transmission in which a packet is transmitted from the user router CPE A belonging to the VLAN (VID=101) of Enterprise A in Tokyo to the user router CPE C belonging to the VLAN (VID=1501) of Enterprise A in Osaka.

The user router CPE A 214 transmits a VLAN packet 150 (PKT1) that has been tagged with VID=101. When the packet 150 (PKT1) enters the PE router A 211, the router generates an MPLS packet 154 (PKT2) by removing the tag 152 and adding, in place of the tag 152, a VPN label 156 (26: the VPN identifier of Enterprise A) and a forwarding label 158 (push label), and sends the MPLS packet 154 (PKT2) to the MPLS network 200. The MPLS packet 154 (PKT2) subsequently arrives at the target receive-side PE router C 213 along the preset route through the MPLS network 200 while its forwarding label 158 is replaced. The receive-side PE router C 213 creates a VLAN packet 150 (PKT3) by removing the labels 154 and adding a VLAN identifier (VID=1501) to which the destination user router CPE C belongs and then sends this packet to the VLAN specified by VID=1501. As a result, the VLAN packet 150 (PKT3) arrives at the user router 231.

Figure 13:
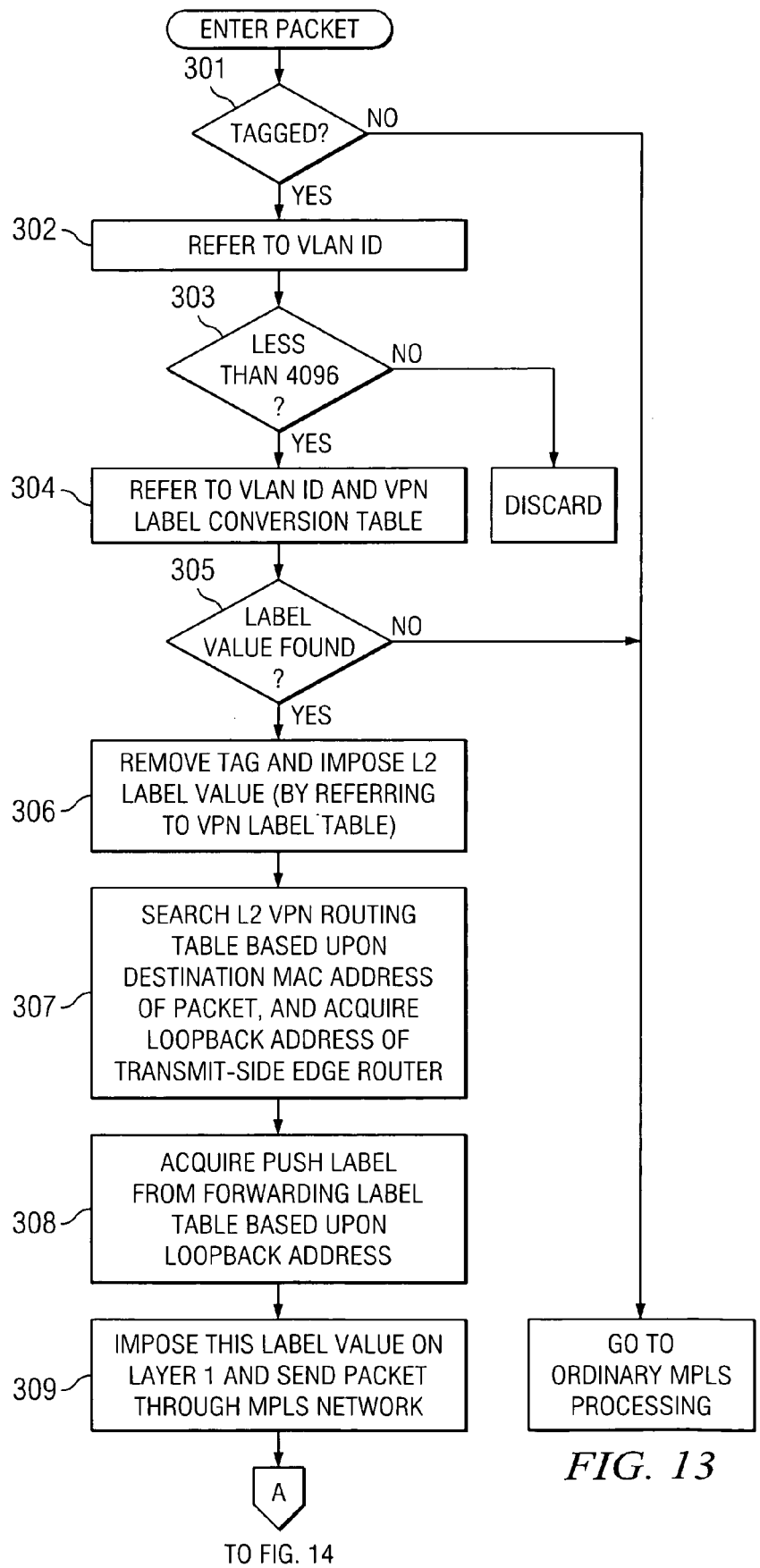
FIG. 13 illustrates one embodiment of a first part of a method for VLAN-mapped MPLS transmit processing.
Figure 14:
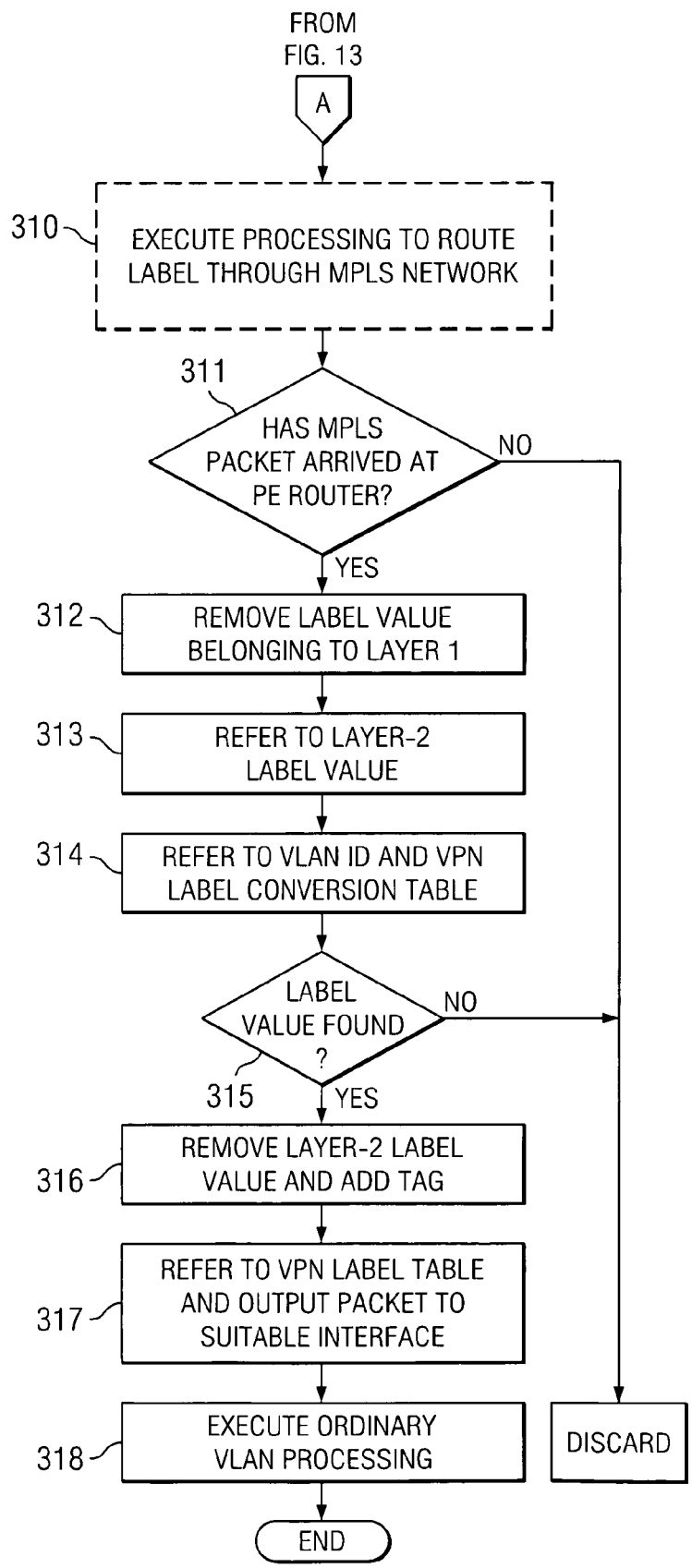
FIG. 14 illustrates one embodiment of a second part of the method for VLAN-mapped MPLS transmit processing.

FIGS. 13-14 illustrate one embodiment of a method for VLAN-mapped MPLS transmit processing. In this embodiment, VLAN packets 150 are received as channelized EoS and separated by the SONET channelization unit in the EoS line card 121.

Referring to FIGS. 13-14, when a packet arrives as an input, the transmit-side PE router 211-213 checks to see whether the packet has been tagged (step 301). Since the packet is an MPLS packet 154 if it has not been tagged, the PE router 211-213 executes ordinary MPLS processing. If the packet has been tagged, the PE router 211-213 extracts the value of the VLAN ID (=VID) contained in the tag 152 (step 302) and checks to determine whether the VID value is equal to or greater than 4096 (step 303). If the VID value is equal to or greater than 4096 ("NO" at step 303), the range of 0 to 4095 of VID values has been exceeded and the edge router 211-213 therefore discards this packet. However, if the VID value lies within the range 0 to 4095 ("YES" at step 303), the PE router 211-213 refers to the VLAN ID and VPN label conversion table 124 (FIG. 9) (step 304) and checks to see whether a VPN label value has been discovered (step 305). If the decision is "NO", then the PE router 211-213 executes ordinary MPLS processing. If the decision is "YES", on the other hand, the PE router removes the tag 152 and imposes a L2 label value (VPN label) 156 (step 306).

Next, based upon the destination MAC address of the packet, the PE router 211-213 obtains the loopback address (IP address) of the receive-side PE router 211-213 from the L2 VPN routing table 125 (step 307). If the loopback address has been found, the PE router 211-213 refers to the forwarding label table 133 to find the forwarding label (push label) (step 308), imposes the push label as L1 and sends the resulting MPLS packet 154 to the MPLS network 200 (step 309).

The above is the processing executed by the PE router 211-213 on the transmitting side. This is followed by execution of processing for routing the MPLS packet 154 through the MPLS network 200. The MPLS packet 154 is forwarded to the target receive-side PE router 211-213 along the set route through the MPLS network 200 while the forwarding label 158 is replaced (step 310).

The receive-side PE router 211-213 checks to see whether the MPLS packet 154 has arrived (step 311). If the MPLS packet 154 has arrived, the PE router 211-213 removes the forwarding label 158 attached as L1 (step 312). Next, the edge router 211-213 extracts the L2 VPN label 156 (step 313), refers to the table 124 indicating the correspondence between the VLAN ID (=VID) and VPN label (step 314) and checks to see whether the VID has been found (step 315). If the VID has not been found, the PE router 211-213 discards the packet 154. If the VID has been found, however, the PE router 211-213 removes the L2 label 156 and adds a tag 152 that contains the VID to create a VLAN packet (step 316). Next, the PE router 211-213 refers to the VPN label table 124 to find the output interface and sends the VLAN packet 150 to the interface (step 317). As previously described, the output interface may be a logical EoS destination at the EoS line card 121. In this embodiment, at the EoS line card 121, the logical EoS value may be mapped to an interface and sub-interface identifying a port and channels. The destination user router CPE C receives the VLAN packet and executes predetermined processing (step 318).

Figure 15A:
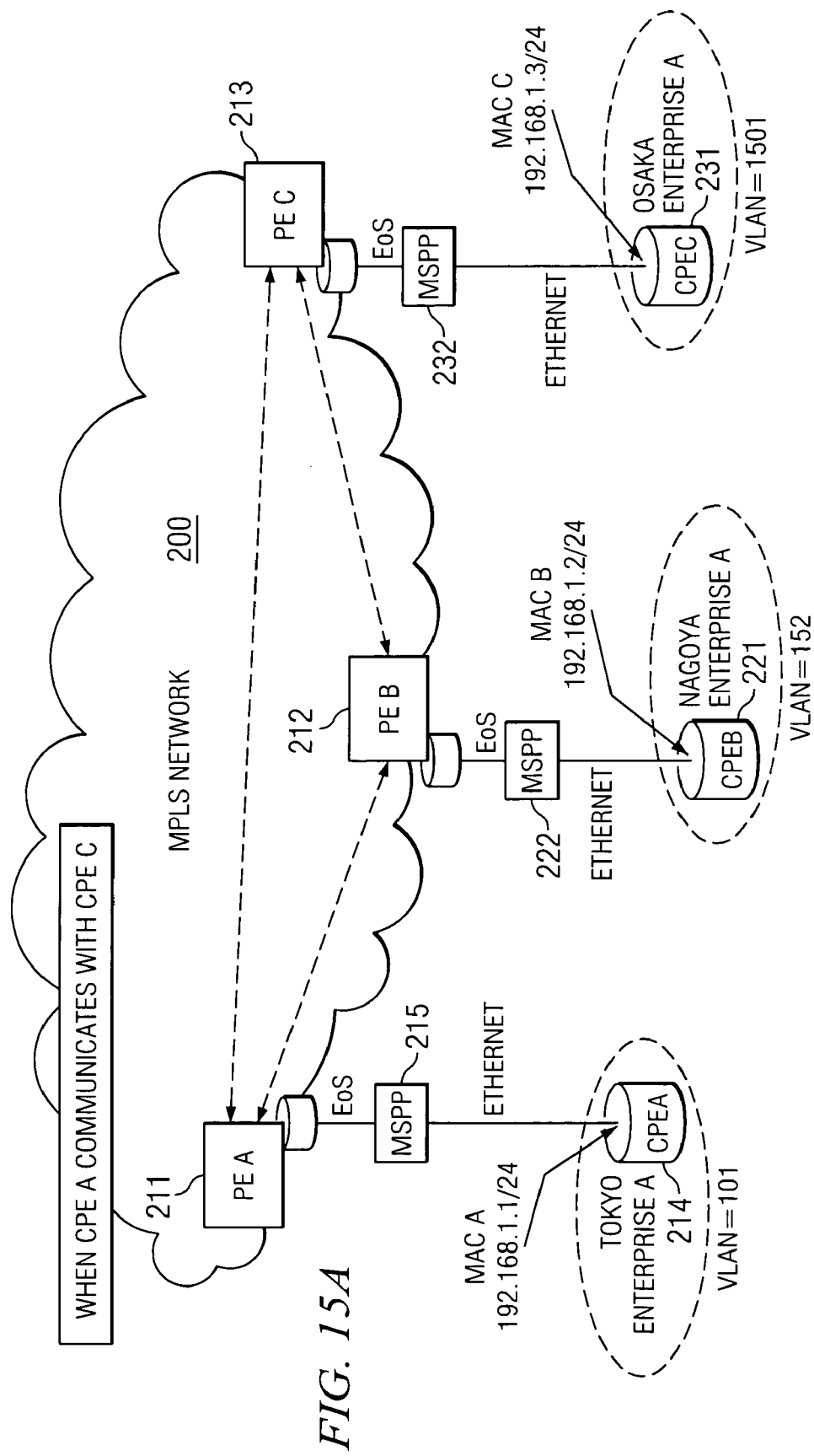
FIGS. 15A-B illustrate one embodiment of learning between CPEs of an enterprise in disparate domains of FIG. 6.
Figures 15B, 16:
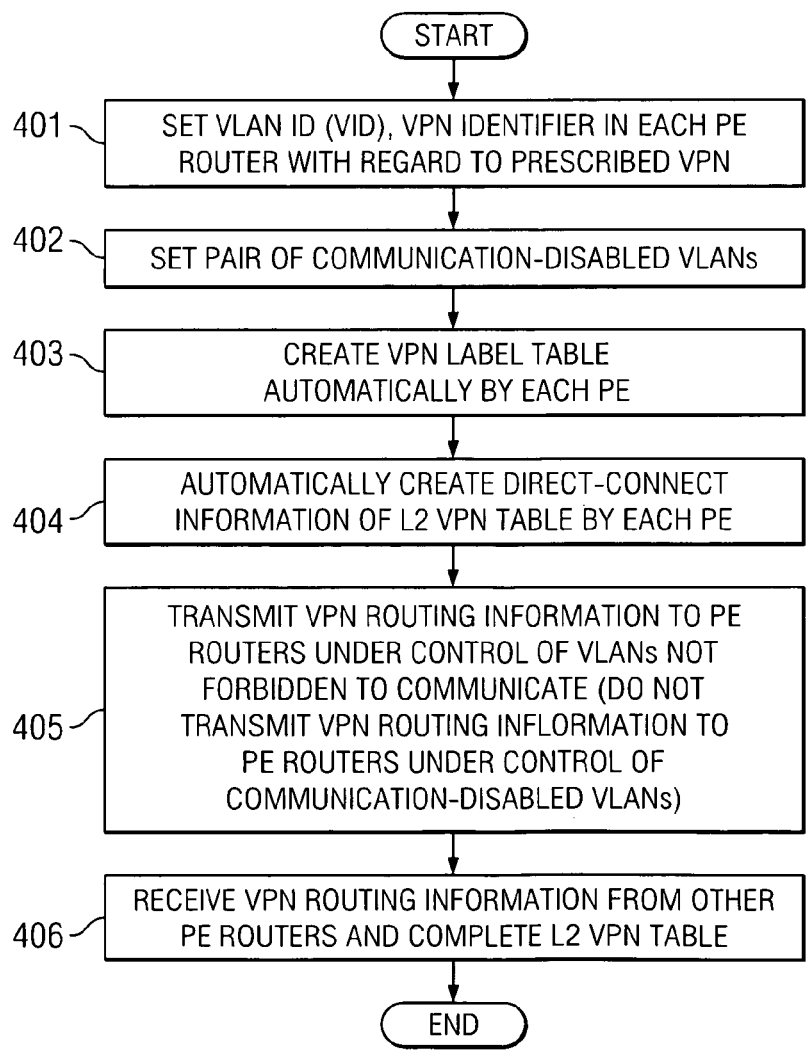
FIG. 16 illustrates one embodiment of a method for creating a VPN table in a communication-disabled VLAN.

FIGS. 15A-B illustrate one embodiment of learning between CPEs of an enterprise and disparate domains of FIG. 6. The structure of a VPN changes from time to time by being enlarged or otherwise modified by the policy of the enterprise. Accordingly, the VPN tables 124, 125 are updated in conformity with the change in VPN structure.

Referring to FIGS. 15A-B, updating is described in a case where the user router CPE A communicates with the user router CPE C of Enterprise A in FIG. 6. If the MAC address of the destination user router CPE C 231 is unknown, the user router CPE A 214 broadcasts an ARP packet containing the IP address of the router CPE C. Upon receiving the ARP packet (broadcast packet), the PE router A 211 creates a copy of the packet and directs it through the other PE routers B 212 and C 213. Upon receiving the ARP packet containing its own IP address, the user router CPE C imposes its own MAC address on an ARP-replay packet and sends back this packet. Each PE router automatically updates the MAC address of each CPE in the VPN label table 124 and L2 VPN routing table 125 according to the ARP-reply packet. An ARP packet containing the IP address of each router is broadcast periodically to update each table.

The processing for creating a VPN table described with reference to FIGS. 10 and 11 is for a case where VLANs can communicate with each other freely. However, there are cases where it is desired to prohibit the communication between certain VLANs even though they belong to the same VPN. In such cases, the communication of routing information by iBGP is halted between the edge routers to which the VLANs for which communication is disabled belong. If this arrangement is adopted, the MAC address of the router CPE whose communication is to be disabled and the loopback address (IP address) of the edge router to which this router CPE is connected will no longer be registered in the L2 VPN routing table 125.

FIG. 16 illustrates one embodiment of processing for creating the L2 VPN routing table 125 in a case where communication-disabled VLANs exist. In regard to a prescribed VPN, a VLAN ID (VID) and a VPN identifier (VPN label) are input to and set in each PE router 211-213 (step 401). The pair of VLANs for which communication is to be disabled is then entered (step 402).

Each PE router 211-213 creates the VPN label table 124 automatically (step 403) and then creates direct-connect information in the L2 VPN routing table 125 (step 404). Using iBGP, each router 211-213 then transmits VPN routing information (the MAC address of the edge router CPE and the loopback address of the edge router) to PE routers 211-213 under the control of VLANs whose communication is not disabled (step 405). VPN routing information is not transmitted to PE routers 211-213 under the control of VLANs whose communication is disabled. Each PE router 211-213 receives routing information sent from the other PE routers 211-213 and creates the L2 VPN routing table 125 using the routing information (step 406). Thus, the MAC address of a router CPE whose communication is to be disabled and the address of the PE router 211-213 to which this router CPE is connected will not be registered in the L2 VPN routing table 125 of the PE router 211-213. As a result, a forwarding label cannot be acquired and communication with the VLAN whose communication is to be disabled can no longer be carried out.

Figure 17A:
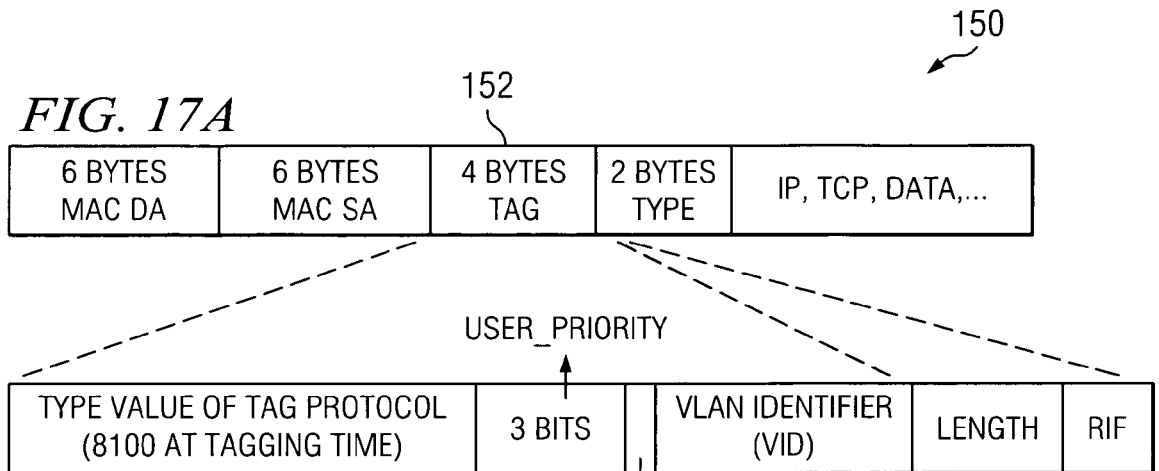
FIGS. 17A-B illustrate one embodiment of correspondence between user priority in a VLAN and IP precedence in MPLS.
Figure 17B:
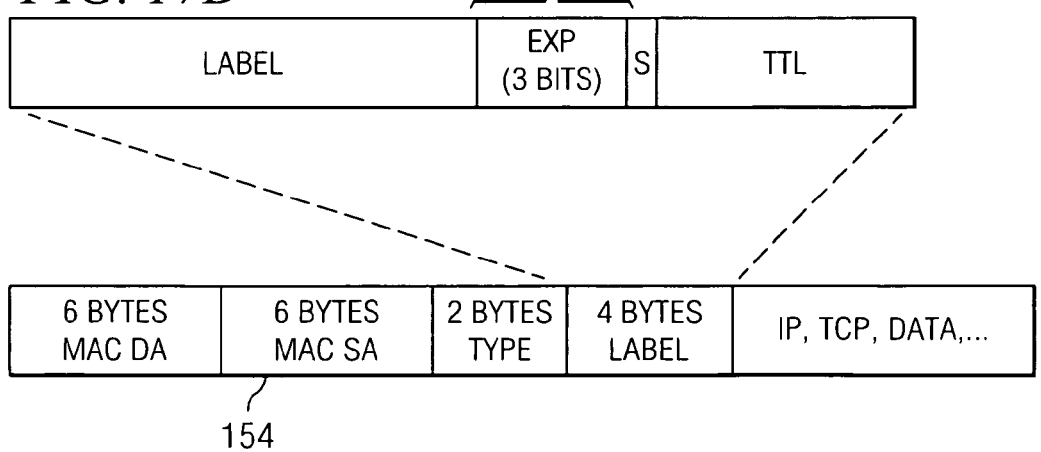

FIG. 17A-B illustrate one embodiment of correspondence between user priority and a VLAN and IP precedence and MPLS. Referring to FIG. 17A, the tag 152 of a VLAN packet 150 includes 3-bit user priority and it is arranged so that the priority value stipulated by each MAC is entered using these three bits. A priority value can take on eight levels of 0 to 7. User priority is low if the value is small (e.g., 0) and high if the value is large.

The label of an MPLS packet 154, on the other hand, includes a 3-bit experimental field EXP, as shown in FIG. 17B. IP precedence is expressed using these three bits. IP precedence also is a priority value that can take on eight levels of 0 to 7. Priority is low if the value is small (e.g., 0) and high if the value is large. Accordingly, when a conversion is made from a VLAN packet 150 to an MPLS packet 154 in a PE router 211-213, the 3-bit user priority is inserted into the EXP field. When a conversion is made from an MPLS packet 154 to a VLAN packet 150, the IP precedence of the 3-bit EXP field is inserted into the user-priority field. Thus, in one embodiment, priority control in a VLAN can be continued as IP precedence control in an MPLS network. Further, it is possible to return from IP precedence control to the original priority control in a VLAN.

Although the present invention has been described in detail, various changes and modifications may be suggested to one skilled in the art. It is intended that the present invention encompass such changes and modifications as falling within the scope of the appended claims.

What is claimed is:

1. A Virtual Private Network (VPN), comprising:
   a Multi Protocol Label Switching (MPLS) network;
   a plurality of Virtual Local Access Networks (VLANs) each coupled to an edge router of the shared label switching network, the VLANs each communicating traffic with a corresponding edge router utilizing channelized Ethernet over SONET (EoS); and
   the edge routers interfacing the VLANs with the MPLS network, the edge routers comprising:
      a transmit-side edge router operable to convert an ingress VLAN packet received from a VLAN and associated with a VPN to an MPLS packet and to send the MPLS packet to the MPLS network, wherein converting an ingress VLAN packet to an MPLS packet comprises identifying a VPN label that corresponds to a VLAN identifier (VIP) of the ingress VLAN packet and generating an MPLS packet having the VPN label; and
      a receive-side edge router operable to convert an MPLS packet received from the MPLS network to an egress VLAN packet and sending the egress VLAN packet to a VLAN associated with the VPN, wherein converting the received MPLS packet to an egress VLAN packet comprises identifying a VID that corresponds to a VPN label contained in the received MPLS packet and generating a VLAN packet having the VID.

2. The VPN of claim 1, the edge routers each comprising a first table storing correspondence between VLAN identifiers (VIPs) contained in VLAN packets and VPN labels contained in MPLS packets.

3. The VPN network of claim 1, wherein each edge routers comprises:
   a route decision unit for determining a route which directs an MPLS packet to a receive-side edge router;
   a second table for storing forwarding labels, which specify routes decided by the route decision unit, mapped to addresses of receive-side edge routers; and
   the transmit-side edge router finds a receive-side edge router corresponding to a destination of a packet, finds a forwarding label, which corresponds to the receive-side edge router, from the second table, generates an MPLS packet that contains the VPN label and the forwarding label and sends the MPLS packet to the MPLS network.

4. The VPN of claim 1, wherein a first edge router which constructs the VPN and is connected to a VLAN sends a second edge router an address set including an address of a VLAN-compatible device connected to the first edge router and the address of the first edge router, and each edge router creates a routing table based upon the received information.

5. The VPN of claim 4, wherein the transmit-side edge router finds a receive-side edge router, which corresponds to the destination of the packet, from said routing table.

6. The VPN of claim 1, wherein the transmit-side edge router discards a VLAN packet having a VID value that is greater than a set value.

7. The VPN of claim 1, wherein the transmit-side edge router inserts user priority information, which is contained in a tag of a VLAN packet, into a label of an MPLS packet as IP precedence information of the MPLS network, and the receive-side edge router inserts IP precedence information, which is contained in the label of an MPLS packet, into the tag of a VLAN packet as user priority information of the VLAN.

8. An edge router of a shared label switching network, comprising:
   an Ethernet over SONIET (EoS) line card including a SONET channelization element operable to receive from a Virtual Local Access Network (VLAN) a channelized EoS signal including a plurality of Ethernet channels and to send VLAN packets received in each of the Ethernet channels to a corresponding Ethernet interface;
   one or more Virtual Private Network (VPN) units coupled to the Ethernet interfaces and operable to identify a VPN for the VLAN packets and to send the VLAN packets to a corresponding VPN subrouter based on the VPN; and
   each VPN subrouter operable to convert the VLAN packets to a label switching packet for transmission over the shared label switching network in the VPN, wherein converting a VLAN packet to a label switching packet comprises identifying a VPN label that corresponds to a VLAN identifier (VIP) of the VLAN packet and generating a label switching packet having the VPN label and a forwarding label.

9. The edge router of claim 8, wherein the label switching network comprises a Multi Protocol Label Switching (MPLS) network.

10. The edge router of claim 8, wherein each VPN subrouter is further operable to convert the VLAN packet to the label switching packet for transmission over the shared label switching network by inserting user priority information from the VLAN packet into a label of the label switching packet.

11. A method, comprising:
    receiving a SONET frame including a plurality of Ethernet channels, each Ethernet channel including ingress Virtual Local Access Network (VLAN) packets associated with one or more Virtual Private Networks (VPNs);
    determining a VPN associated with each ingress VLAN packet; and
    converting each ingress VLAN packet to an egress label switching packet based on the associated VPN for transmission over a shared network, wherein converting a VLAN packet to an egress label switching packet comprises identifying a VPN label that corresponds to a VLAN identifier (VID) of the VLAN packet and generating an egress label switching packet having the VPN label and a forwarding label.

12. The method of claim 11, wherein the egress label switching packet comprises a Multi Protocol Label Switching (MPLS) packet.

13. A method, comprising:
    receiving a channelized Ethernet over SONET (EoS) signal comprising a plurality of Ethernet channels, each Ethernet channel including a plurality of Virtual Local Access Network (VLAN) packets;
    demultiplexing the Ethernet channels;
    determining a Virtual Private Network (VPN) associated with each VLAN packet of each Ethernet channel; and
    converting the VLAN packets for each Ethernet channel to label switching packets based on the associated VPN for transmission through a shared label switching network, wherein converting a VLAN packet to a label switching packet comprises identifying a VPN label that corresponds to a VLAN identifier (VID) of the VLAN packet and generating a label switching packet having the VPN label and a forwarding label.

14. The method of claim 13, wherein the label switching network comprises a Multi Protocol Label Switching (MPLS) network and the label switching packets comprise MPLS packets.

\* \* \* \* \*

UNITED STATES PATENT AND TRADEMARK OFFICE
CERTIFICATE OF CORRECTION

PATENT NO. : 7,366,181 B2  Page 1 of 1
APPLICATION NO. : 10/656702
DATED : April 29, 2008
INVENTOR(S) : Paul F. Havala It is certified that error appears in the above-identified patent and that said Letters Patent is hereby corrected as shown below:

Column 8:
Line 1, after "fiers" delete "(VIDS)" and insert -- (VIDs) --.

Column 12:
Line 40, Claim 1, after "VLAN identifier" delete "(VIP)" and insert -- (VID) --.
Line 55, Claim 2, after "fiers" delete "(VIPs)" and insert -- (VIDs) --.

Column 13:
Line 26, Claim 8, after "an Ethernet over" delete "SONIET" and insert -- SONET --.
Line 43, Claim 8, after "VLAN identifier" delete "(VIP)" and insert -- (VID) --.

Signed and Sealed this

Fourteenth Day of July, 2009

JOHN DOLL
*Acting Director of the United States Patent and Trademark Office*